(12) United States Patent
Wang (10) Patent No.: US 11,846,972 B2
(45) Date of Patent: Dec. 19, 2023

(54) METHOD AND APPARATUS FOR GENERATING SOFTWARE TEST REPORTS

(71) Applicant: National Taiwan University, Taipei (TW)

(72) Inventor: Farn Wang, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 17/718,299

(22) Filed: Apr. 11, 2022

(65) Prior Publication Data

US 2022/0334959 A1 Oct. 20, 2022

(30) Foreign Application Priority Data

Apr. 14, 2021 (TW) ................................. 110113319

(51) Int. Cl.
*G06F 11/36* (2006.01)
*G06F 40/205* (2020.01)

(52) U.S. Cl.
CPC ...... *G06F 11/3688* (2013.01); *G06F 11/3692* (2013.01); *G06F 40/205* (2020.01)

(58) Field of Classification Search
CPC . G06F 11/3688; G06F 11/3692; G06F 40/205
USPC .............. 717/124–141; 706/12–45
See application file for complete search history.

(56) References Cited

U.S. PATENT DOCUMENTS

| 5,754,755 | A | * | 5/1998 | Smith, Jr. | ........... | G06F 11/3684 |
| | | | | | | 714/E11.208 |
| 6,002,871 | A | * | 12/1999 | Duggan | .............. | G06F 11/3684 |
| | | | | | | 714/38.12 |
| 7,386,521 | B2 | * | 6/2008 | Adir | .................... | G06F 11/3684 |
| | | | | | | 706/14 |
| 7,480,640 | B1 | * | 1/2009 | Elad | ....................... | G06Q 10/10 |
| | | | | | | 706/14 |

(Continued)

FOREIGN PATENT DOCUMENTS

| CN | 107273298 | 10/2017 |
| TW | 200817931 | 4/2008 |

OTHER PUBLICATIONS

Alshahwan et al, "Automated Web Application Testing Using Search Based Software Engineering", IEEE, pp. 3-12 (Year: 2011).*

(Continued)

*Primary Examiner* — Anil Khatri
(74) *Attorney, Agent, or Firm* — JCIPRNET (57) ABSTRACT

A method and an apparatus for generating software test reports are provided. The method includes following steps: providing a testing platform that supports retrieving one or more documents such as screenshots or DOM-like documents related to screen content of an application under test (AuT) and analyzing the documents to obtain description data of the screen content; selecting to execute a test report generator, and querying the description data, multiple test scripts ever executed on a system under test (SuT) and multiple test actionables from the testing platform by the test report generator, so as to evaluate a test trace of the AuT, (Continued)

calculate at least one test actionable and test data adapted for the AuT, and return the calculated test actionable to the testing platform; and executing the test actionable on the AuT in the SuT by the testing platform, so as to generate test reports of the AuT.

11 Claims, 4 Drawing Sheets

(56) References Cited

U.S. PATENT DOCUMENTS

| | | | | |
|---|---|---|---|---|
| 7,937,622 | B2* | 5/2011 | Mehrotra | G06F 11/3684 717/124 |
| 8,397,217 | B2* | 3/2013 | Goryachev | G06F 11/3668 717/124 |
| 9,047,414 | B1* | 6/2015 | Matyjek | G06F 11/3692 |
| 9,213,625 | B1 | 12/2015 | Schrage | |
| 9,753,843 | B2* | 9/2017 | Kandpal | G06F 11/3684 |
| 10,642,721 | B2* | 5/2020 | Kulkarni | G06F 11/3688 |
| 10,747,651 | B1* | 8/2020 | Vanderwall | G06F 11/3684 |
| 10,838,848 | B2* | 11/2020 | Fong | G06N 3/045 |
| 10,949,338 | B1* | 3/2021 | Sirianni | G06N 20/10 |
| 11,200,154 | B2* | 12/2021 | Partlow | G06F 11/3688 |
| 11,727,274 | B1* | 8/2023 | Forristal | G06N 3/045 706/15 |
| 11,755,919 | B2* | 9/2023 | Vidal | G06F 11/3664 706/25 |
| 11,768,636 | B2* | 9/2023 | Gold | G06F 3/0649 709/203 |
| 2009/0199047 | A1 | 8/2009 | Vaitheeswaran et al. | |
| 2015/0339213 | A1 | 11/2015 | Lee et al. | |
| 2019/0384699 | A1* | 12/2019 | Arbon | G06N 3/006 |

OTHER PUBLICATIONS

Havrikov et al, "Generating Unit Tests with Structured System Interactions", IEEE, pp. 30-33 (Year: 2017).*

He et al, "ShadowCrypt: Encrypted Web Applications for Everyone", ACM, pp. 1028-1039 (Year: 2014).*

Cheon et al, "Optimized Search-and-Compute Circuits and Their Application to Query Evaluation on Encrypted Data", IEEE, pp. 188-199 (Year: 2016).*

Mirzaaghaei et al, "DOM-Based Test Adequacy Criteria for Web Applications", ACM, pp. 71-81 (Year: 2014).*

Yuniasri et al , "A Comparative Analysis of Quality Page Object and Screenplay Design Pattern on Web-based Automation Testing", IEEE, pp. 1-5 (Year: 2020).*

"Office Action of Taiwan Counterpart Application", dated Aug. 30, 2022, p. 1-p. 7.

* cited by examiner

```
testAction, testData = myTRG.getTestInput()
while testAction != 'exitTRG':
    execute testAction with testData.
    testAction, testData = myTRG.getTestInput()
```

```
class myTRG:
    def __init__(self, *args):
            Initialize the TRG
    def getTestInput(self):
                Query data about the screen contents and the test session.
                Issue test reports if necessary.
                Calculate the test action and test data.
                Return the test action and test data.
```

METHOD AND APPARATUS FOR GENERATING SOFTWARE TEST REPORTS

CROSS-REFERENCE TO RELATED APPLICATION

This application claims the priority benefit of Taiwan application serial no. 110113319, filed on Apr. 14, 2021. The entirety of the above-mentioned patent application is hereby incorporated by reference herein and made a part of this specification.

BACKGROUND

Technical Field

The disclosure generally relates to a testing method and a testing apparatus, in particular, to a method and an apparatus for generating software test reports.

Description of Related Art

During a software testing process, software testers have to seek solutions to various testing tasks and construct a quality assurance (QA) solution in a testing project by themselves. This is time-consuming and costly, and it is difficult to evaluate costs and benefits of each solution for every task.

Currently, an automated testing technology provider may exchange with others in the following two ways. One is to join an automated testing tool development company or team. However, in this case, a transaction between the provider and an actual user can only be made through the company as an intermediary. The other way is to develop an add-on module on an open testing platform (for example, Selenium) which allows add-ons. However, such add-ons generally focus on a single testing task and do not test the whole software.

Therefore, an open platform is needed which integrates automated testing technology resources and enables technological exchange between automated testing technology users and developers.

SUMMARY

The disclosure is directed to a method and an apparatus for generating software test reports, by which a software tester may exchange with others on testing technology.

The disclosure provides a method for generating software test reports which is adapted for an electronic device with a processor. The method includes the following. A testing platform that supports retrieving one or more documents such as screenshots or DOM-like documents related to screen content of an application under test (AuT) is provided, and the documents are analyzed to obtain description data of the screen content. A test report generator is selected and executed, and the description data, multiple test scripts ever executed on a system under test (SuT) and multiple test actionables are queried from the testing platform by the test report generator, so as to evaluate a test trace of the AuT, calculate at least one test actionable and test data adapted for the AuT, and return the calculated test actionable and test data to the testing platform. The test actionable is executed on the AuT in the SuT by the testing platform, so as to generate a test report of the AuT.

The disclosure provides an apparatus for generating software test reports. The apparatus includes a display device, an input device, a storage device, and a processor. The input device is configured to receive an input operation of a user. The storage device is configured to store a computer program. The processor is coupled to the display device, the input device, and the storage device and is configured to load and execute the computer program to: provide a testing platform, retrieve one or more documents related to screen content of an application under test (AuT) by the testing platform, and analyze the documents to obtain description data of the screen content; select to execute a test report generator, and query the description data, multiple test scripts ever executed on a system under test (SuT) and multiple test actionables from the testing platform by the test report generator, so as to evaluate a test trace of the AuT, calculate at least one test actionable and test data adapted for the AuT, and return the calculated test actionable and test data to the testing platform; and execute the test actionable on the AuT in the SuT by the testing platform, so as to generate a test report of the AuT.

In the method and the apparatus for generating software test reports of the disclosure, one or more documents related to the screen content of the application under test are analyzed and described in a DOM-like language, such that a test report generator using the description data supports cross-platform and cross-application testing. The test report generator evaluates and calculates a test actionable adapted for the application under test by querying data from the testing platform. Finally, the testing platform executes the test actionable and generates a test report. Accordingly, embodiments of the disclosure provide a testing platform that facilitates sharing, testing and use of a test report generator, thereby promoting exchange of software testing technology.

To facilitate understanding the features and benefits of the disclosure, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the method and the apparatus for generating software test reports in the embodiments of the disclosure, a testing platform is constructed for a developer and a user of a test report generator to exchange and transact the test report generator. The test report generator is a product designed to promote exchange of software testing technology and may be developed by any third party. The testing platform in the embodiments of the disclosure allows a developer to easily access from a test report generator they have developed, and also provides a one-click test report-generating function such that a user can easily perform testing on the testing platform and select to execute an applicable test report generator.

Figure 1:
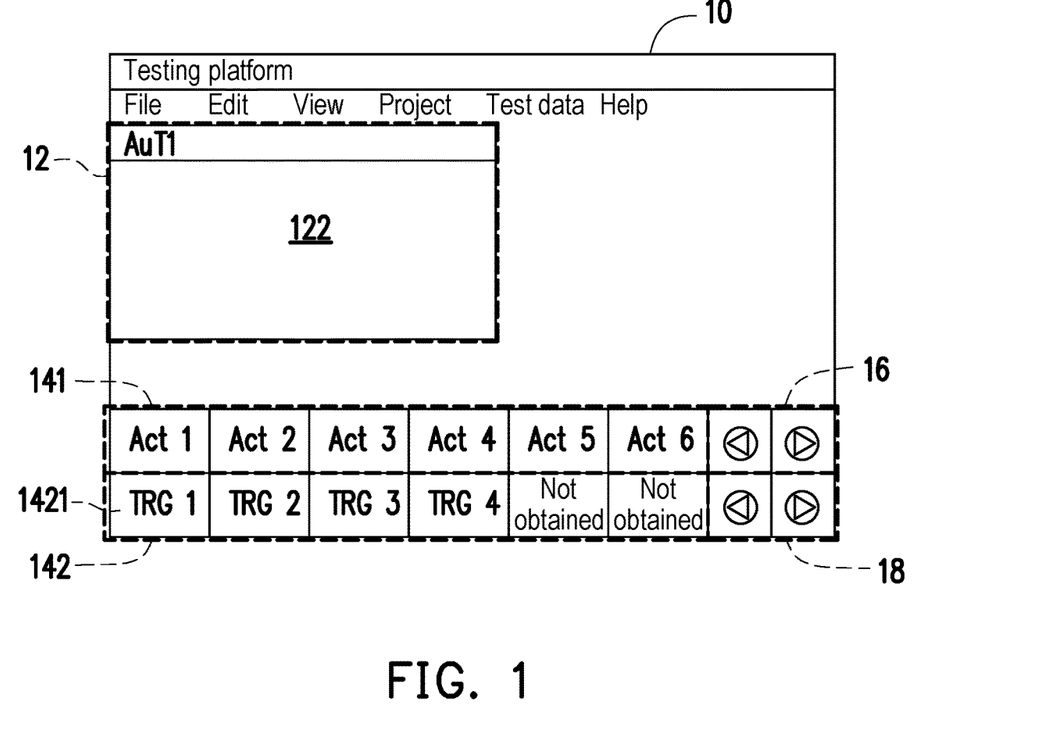
FIG. 1 is a user interface of a testing platform of test report generators illustrated according to an embodiment of the disclosure.

FIG. 1 is a user interface of a testing platform of test report generators illustrated according to an embodiment of the disclosure. Referring to FIG. 1, a user interface 10 in the embodiment provides multiple functions for a developer and a user to share and use a test report generator. A screen 12 of an application under test (AuT) displays an execution screen 122 of an AuT launched by a current user. A test actionable field 141 displays a triggerable screen element (such as triggerable screen elements Act 1 to Act 6 shown in FIG. 1) obtained through analysis of the current screen by the testing platform. A test report generator field 142 displays a test report generator (such as test report generators TRG 1 to TRG 4 shown in FIG. 1) obtained and executable by the user. The user may click on any triggerable screen element in the test actionable field 141, and the triggerable screen element is executed by the testing platform. When it is not possible to display all the triggerable screen elements on one page, the triggerable screen elements may be displayed on separate pages, and the user may switch between pages with a switch button 16. The user may click on a button corresponding to any test report generator in the test report generator field 142 to launch the test report generator to automatically generate one or more test reports. When it is not possible to display all the test report generators on one page, the test report generators may be displayed on separate pages, and the user may switch between pages with a switch button 18. For example, when the user clicks on a button 1421 corresponding to the test report generator TRG 1, the testing platform automatically performs a series of automatic test actions on the execution screen 122 and new screen contents following the screen 122 of the screen 12 of the AuT and generates a test report by the test report generator TRG 1. Accordingly, the embodiments of the disclosure provide the user interface 10 which is simplified and allows the user to easily select to execute a test report generator. Since the user interface 10 only displays test report generators available without displaying any software testing technological details, the user's ease in performing software testing can be improved.

Figure 2:
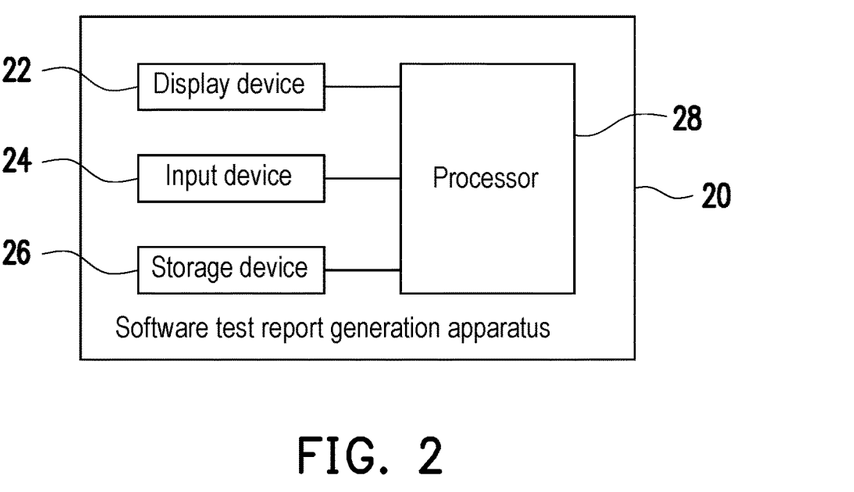
FIG. 2 is a block diagram of an apparatus for generating software test reports illustrated according to an embodiment of the disclosure.

FIG. 2 is a block diagram of an apparatus for generating software test reports illustrated according to an embodiment of the disclosure. Referring to FIG. 2, a software test report generation apparatus 20 of the embodiment may be, for example but not limited to, a computing apparatus such as a file server, database server or application server having a computation capability, a work station, or a personal computer, or a mobile apparatus such as a cellphone or a tablet, or a distributed system whose components may be connected via, for example, internet. The software test report generation apparatus 20 includes a display device 22, an input device 24, a storage device 26, and a processor 28, whose respective functions are as follows:

The display device 22 is, for example but not limited to, a monitor or television that adopts a liquid crystal display (LCD), a light-emitting diode (LED), a field emission display (FED) or other type of panel as a display panel and adopts a cold cathode fluorescent lamp (CCFL) or an LED as a backlight module.

The input device 24 is, for example but not limited to, an input tool such as a keyboard, a mouse, a remote control, a touchpad or a touch screen that is capable of detecting a user input operation. In some embodiments, the input device 24 is, for example, a touch panel, and may be integrated with the display device 22 into a touch screen, so as to provide both display and operation functions.

The storage device 26 is, for example, any type of fixed or mobile random access memory (RAM), read-only memory (ROM), flash memory, hard disk, or other similar element, or a combination thereof. The storage device 26 is configured to store a computer program executable by the processor 28 and data usable by the processor 28.

In some embodiments, the software test report generation apparatus 20 may additionally include a connection device (not illustrated) that may be configured to connect to the user's mobile computing device such as a cellphone or a tablet; the disclosure is not limited thereto. In some embodiments, the processor 28 may install an object file of the AuT from the storage device 26 onto the mobile computing device so as to test the AuT. The connection device may be, for example but not limited to, a wired connection device of universal serial bus (USB) interface, RS232 interface, universal asynchronous receiver/transmitter (UART) interface, inter-integrated circuit (I2C) interface, serial peripheral interface (SPI), DisplayPort interface, Thunderbolt interface, or local area network (LAN) interface, or a wireless connection device which supports a communication protocol such as wireless fidelity (Wi-Fi), RFID, Bluetooth, infrared, near-field communication (NFC), or device-to-device (D2D).

The processor 28 is, for example but not limited to, a central processing unit (CPU), other programmable general-purpose or special-purpose microprocessor, microcontroller, digital signal processor (DSP), programmable controller, application specific integrated circuit (ASIC), programmable logic device (PLD), or other similar device or a combination of the above devices. In the embodiment, the processor 28 may load a computer program from the storage device 26 to execute the method for generating software test reports in the embodiments of the disclosure.

Figure 3:
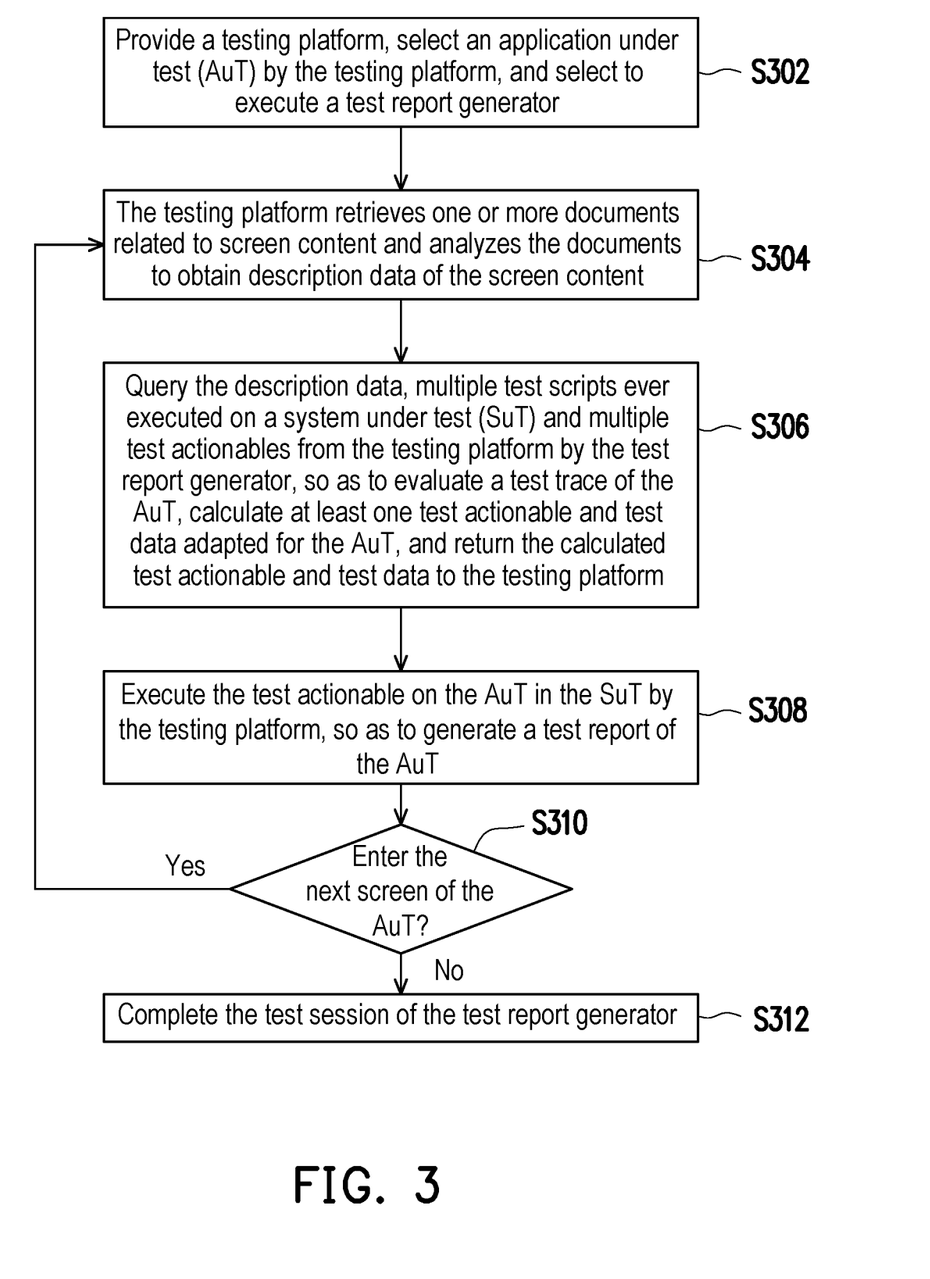
FIG. 3 is a flow chart of a method for generating software test reports illustrated according to an embodiment of the disclosure.

FIG. 3 is a flow chart of a method for generating software test reports illustrated according to an embodiment of the disclosure. Referring to FIG. 2 and FIG. 3 together, the method of the embodiment is adapted for the software test report generation apparatus 20. The steps of the method for generating software test reports of the embodiment are described in detail in the following with reference to the elements of the software test report generation apparatus 20.

In step S302, in the software test report generation apparatus 20, a testing platform is provided by the processor 28. The testing platform selects an application under test (AuT), and the processor 28 selects to execute a test report generator.

In step S304, the testing platform retrieves one or more documents related to screen content and analyzes the documents to obtain description data of the screen content. The document is, for example, a screen content document (SCD) such as a screenshot or a DOM-like document.

In some embodiments, the processor 28 may, for example, analyze the SCD using a three-stage identification approach, and obtain the description data (for example, a user-interface analytic description (UIAD)) of the screen content. The description data is described in, for example, a document object model (DOM) language for unified notation for multiple systems under test (SuTs), so as to enable the test report generator to support cross-platform (cross-operating system) testing and to be applied in different types of systems or apparatuses.

Figure 4:
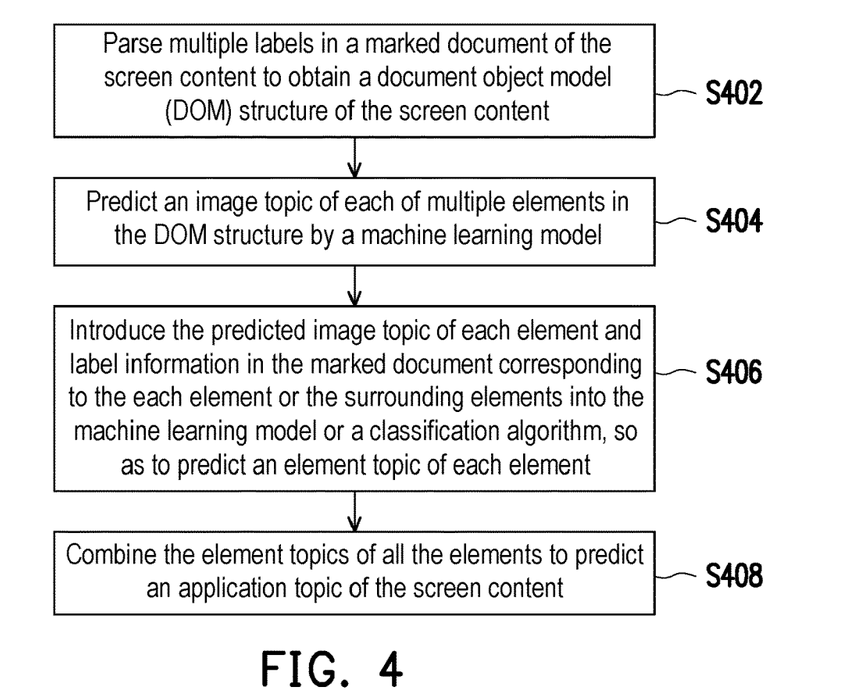
FIG. 4 is a flow chart of a method for generating screenshot description data illustrated according to an embodiment of the disclosure.

More specifically, FIG. 4 is a flow chart of a method for generating description data of screen content illustrated according to an embodiment of the disclosure. Referring to FIG. 2 and FIG. 4 together, the method of the embodiment is adapted for the software test report generation apparatus 20 and is used to provide information of a DOM structure of the screen content of the AuT.

In step S402, multiple labels in a marked document of a screenshot are parsed by the processor 28 to obtain the DOM structure of the screen content.

In some embodiments, the processor 28, for example, executes a parser to parse the marked document of the current screen content, for example, HyperText Markup Language (HTML) or Extensible Markup Language (XML), thus obtaining the DOM structure of the screen content. The DOM structure may also be constructed with an image analysis technique, but is not limited thereto.

In step S404, the processor 28 predicts an image topic of each of multiple elements in the DOM structure by a machine learning model.

More specifically, the processor 28, for example, trains a machine learning model by using image analysis and/or machine learning techniques, and uses the machine learning model to predict an image topic of an element in the DOM structure of the screenshot. For example, a right-pointing triangle in the screenshot may be classified as representing "play." The image may be obtained from a server through the Internet or be directly retrieved from the screenshot, and a predicted value may be an image topic mark, image topic marks with a relatively high confidence value, or vectors of confidence values of different image topics.

In step S406, the predicted image topic of each element and labeling information in the marked document corresponding to the element and a surrounding element are introduced into the machine learning model or a classification algorithm by the processor 28, so as to predict an element topic of each element.

More specifically, with respect to each element in the DOM structure, the processor 28, for example, predicts the element topic of the element through the image topic obtained by the technique described above, a label name and an attribute value in the marked document corresponding to the element or the surrounding element, and an element adjacent to the element. The prediction step may be performed through a machine learning technique, or any natural language processing technique or classification algorithm adopting supervised or unsupervised machine learning.

In step S408, the element topics of all the elements are combined by the processor 28, so as to predict an application topic of the screen content and an element structure of the application topic.

More specifically, after the element topics of key elements on a current screen are obtained, the processor 28 may combine the element topics to predict the application topic of the current screen content and the role of each key element in the application topic. The application topic includes, for example but not limited to, registration (including the key elements such as account name, contact email, password, password confirmation, license agreement, address, and phone number), login (including the key elements such as account name, password, and license agreement), shopping (including the key elements such as product list, shopping cart button, credit card information, and bank account information). The processor 28 realizes the above steps by, for example but not limited to, natural language processing, machine learning, or a stable-marriage algorithm.

In some embodiments, the processor 28 may further simplify an excessively long description of the information in the DOM structure of the screen content of the application under test (AuT), and provide the simplified description to a developer of a test report generator, such that the developer can easily check and modify the test report generator.

More specifically, the processor 28, for example, parses an attribute of each mark in the marked document, identifies the attributes irrelevant to visual and response effects (i.e., effects which can be observed by a human user), and removes the corresponding attributes or DOM elements.

In addition, the processor 28 may unify mark names of the elements, attribute names, and attribute values for all the apparatuses and all types of AuTs, such that the test report generator can be used across different apparatuses. The apparatuses may include a desktop computer, a laptop, a cellphone, or a tablet which adopts an operating system such as Windows, iOS, MacOS, Unix, Linux, or an embedded operating system, but the disclosure is not limited thereto.

In some embodiments, if a DOM element "e" has only one child element "f", the processor 28 may combine the element "e" with the child element "f" to obtain a new element "e'". Accordingly, a child element of the child element "f" becomes a child element of the new element "e'", and a parent element of the element "e" becomes a parent element of the new element "e'". An attribute value of the new element "e'" may be a union of attribute values of the element "e" and the child element "f". Eventually, the element "e" and the child element "f" are discarded and removed from the DOM structure. If there is a conflict between the attributes of the element "e" and the child element "f", values of the conflicted attributes may be combined together as appropriate. In addition, a DOM element with no attribute may also be removed from the DOM structure, and a child element thereof may be changed into a child element of a parent element of the DOM element.

Referring back to the flow chart in FIG. 3, in step S306, the description data of the screen content, multiple test scripts ever executed on a system under test and multiple test actionables are queried from the testing platform by the test report generator, so as to evaluate a test trace of the AuT, calculate at least one test actionable adapted for the AuT and test data corresponding to each test actionable, and return the calculated test actionable and test data to the testing platform. The test actionable may also be described in a unified notation language (for example, DOM), so as to enable the test report generator to support cross-platform (cross-operating system) testing.

In some embodiments, the processor 28 queries, for example but not limited to, one of, or a combination of, multiple environmental settings of the testing platform, type, an execution state and multiple attributes of the SuT, user information of the test report generator, and any other test report generator related to the test report generator.

More specifically, in the embodiment, the test report generator is used as an object which provides a suggestion for a next test actionable. In the object, a function may be executed through the testing platform to call an application programming interface (API) of the test report generator, so as to improve development independence and execution efficiency of the test report generator.

Figure 5:
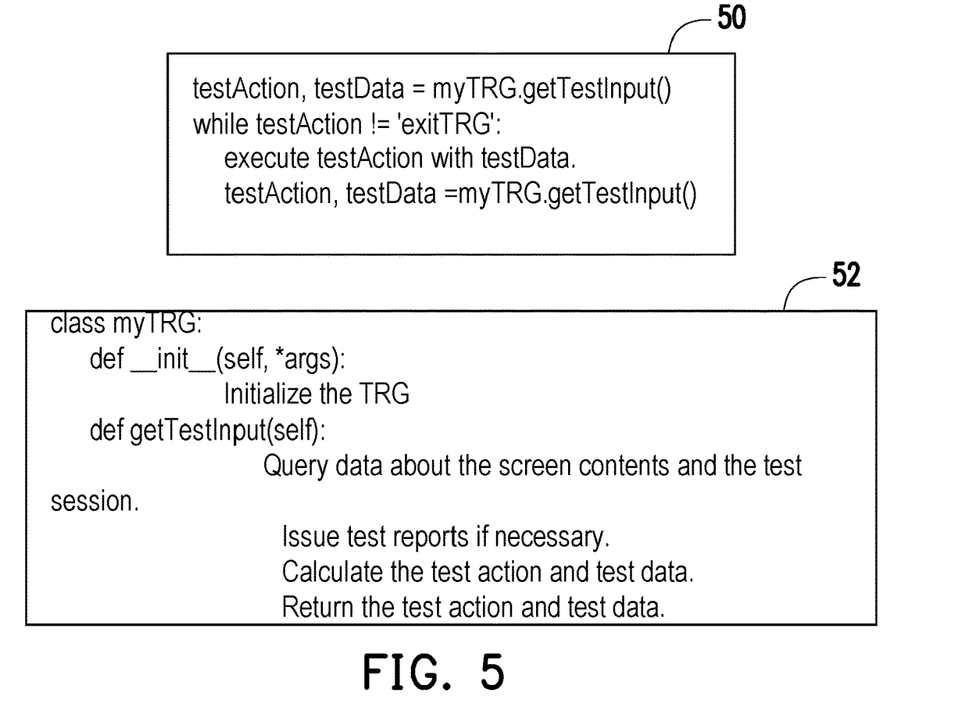
FIG. 5 is a code example of a test report generator illustrated according to an embodiment of the disclosure.

For example, FIG. 5 is a code example of a test report generator illustrated according to an embodiment of the disclosure. A code 52 indicates an example of an interface of the test report generator and is shown herein to be a Python-like pseudo code. In actual application, the code 52 may be written in other programming languages and may still achieve the same effects. The disclosure is not limited thereto.

More specifically, in the embodiment, referring to FIG. 5, a code 50 indicates the following operation. Assuming that the user selects to execute a test report generator named "myTRG" for the current SuT, in response to the user's selection, a software test report generation apparatus, for example, executes a loop described in the code 50 including the following. A function "myTRG.getTestInput( )" is executed by the test platform to resume execution of the "myTRG" object in the code 52. In addition, by the test report generator "myTRG", a state of the current SuT and an element on the screen identified by the testing platform are queried, so as to calculate an actionable named "testAction" adapted for the AuT until the test report generator returns a string "exitAlgorithm".

Note that the API may be used during execution of the test report generator, so as to improve development and execution efficiency of the test report generator. Such API may provide the following functions:

querying an ID of a registered user on a testing platform;
querying operating system (OS) information, interpreter information, or other environmental information of the testing platform;
printing a DOM structure (or a substructure thereof) of a screenshot;
querying type of an application under test (AuT), examples of the AuT including an app of an OS such as Windows, iOS, MacOS, Unix, Linux, or an embedded OS, or a web app;
querying a web address (i.e., uniform resource locator (URL)) of screen content;
querying a web address of an activation page of the AuT;
querying a test report generator that has been purchased by a current user of the testing platform;
querying a test report generator available to be executed by the current user of the testing platform;
establishing a test log in a memory or a hard disk of a computer;
querying information about a test report generator being currently executed;
querying information about a specific test report generator;
querying whether a DOM element of current screen content can be triggered and executed;
querying information about certain test sessions related to the current user and the AuT;
modifying the information about certain test sessions related to the current user and the AuT;
querying information about the AuT;
querying a directory path of a file of the testing platform in a file system of the computer;
querying an execution state of the AuT;
notifying the testing platform of the execution state of the AuT;
controlling and monitoring an apparatus on which the AuT is run, in which the items to be controlled and monitored include, for example, a loudspeaker, a power button, screen backlight, the Global Positioning System (GPS), a subscriber identity module (SIM) card, a secure digital (SD) card, wireless fidelity (Wi-FI), screen rotation, an outgoing phone call made from the apparatus on which the AuT is run, an incoming phone call answered through the apparatus on which the AuT is run, a screen gesture of the apparatus on which the AuT is run, and the Internet connection of the apparatus on which the AuT is run;
installing an application on the apparatus on which the AuT is run;
querying information about a file system of the apparatus on which the AuT is run;
querying foreground and background applications of the apparatus on which the AuT is run;
querying a test script recorded by the testing platform;
requesting the testing platform to provide services of recording a test trace and converting the test trace into the test script for replay;
replaying a recorded test script;
querying an image of the screenshot;
querying the DOM structure of a current screenshot;
querying the test trace of a current or previous test session;
querying a count of steps of a test actionable or other statistics in a current test trace;
querying information about test coverage of all visits, the information including, for example, a list of clusters related to the same or similar screenshots, a list of all actionable elements of all clusters, a list of the elements ever acting in a cluster in the current or previous test session;
selecting some or all test data cards;
establishing or modifying a test data card;
querying the DOM structure of the current screen content;
querying some or all actionable elements of the current screen content;
querying some or all hardware buttons of the apparatus on which the AuT is run;
notifying the testing platform to activate a new test trace;
querying a topic of the screen content predicted by the testing platform;
querying a topic of a DOM element in the DOM structure;
querying a suggestion for data to be entered into a text input element for a test actionable;
issuing one or more test reports by the testing platform, for example, by sending a test report to a large number of people via email, storing a test report in one or more issue tracking systems (for example, Redmine or Bugzilla), storing a test report in a disk, printing a test report or like;
activating a conversational session with a user of the testing platform to allow the user to input test data, a test actionable, a test command, or a test reports during a test session;
checking whether the AuT is still operating;
managing a phone book or contact information;
querying a serial number, model, version or other information about the apparatus on which the AuT is run;
querying an apparatus connected to the apparatus on which the AuT is run or an environment where the testing platform executes a testing task; and
monitoring and replacing a battery of the apparatus on which the AuT is run;

Referring back to the flow chart in FIG. 3, in step S308, the testing platform executed by the processor 28 executes the test actionable returned by the test report generator on the AuT in the SuT, and a test report of the AuT is generated if necessary. After the processor 28 executes the test actionable, the processor 28 may, for example, retrieve and analyze the screen content again, and, in step S310, determines whether to enter a next screen of the AuT. If it is determined to enter the next screen, the process returns to step S304, and the description data of the screen content is established by the processor 28. The description data is provided for the test report generator to calculate a test actionable for a next cycle. In contrast, if it is determined not to enter the next screen, in step S312, the test session of the test report generator is completed by the processor 28.

Figure 6:
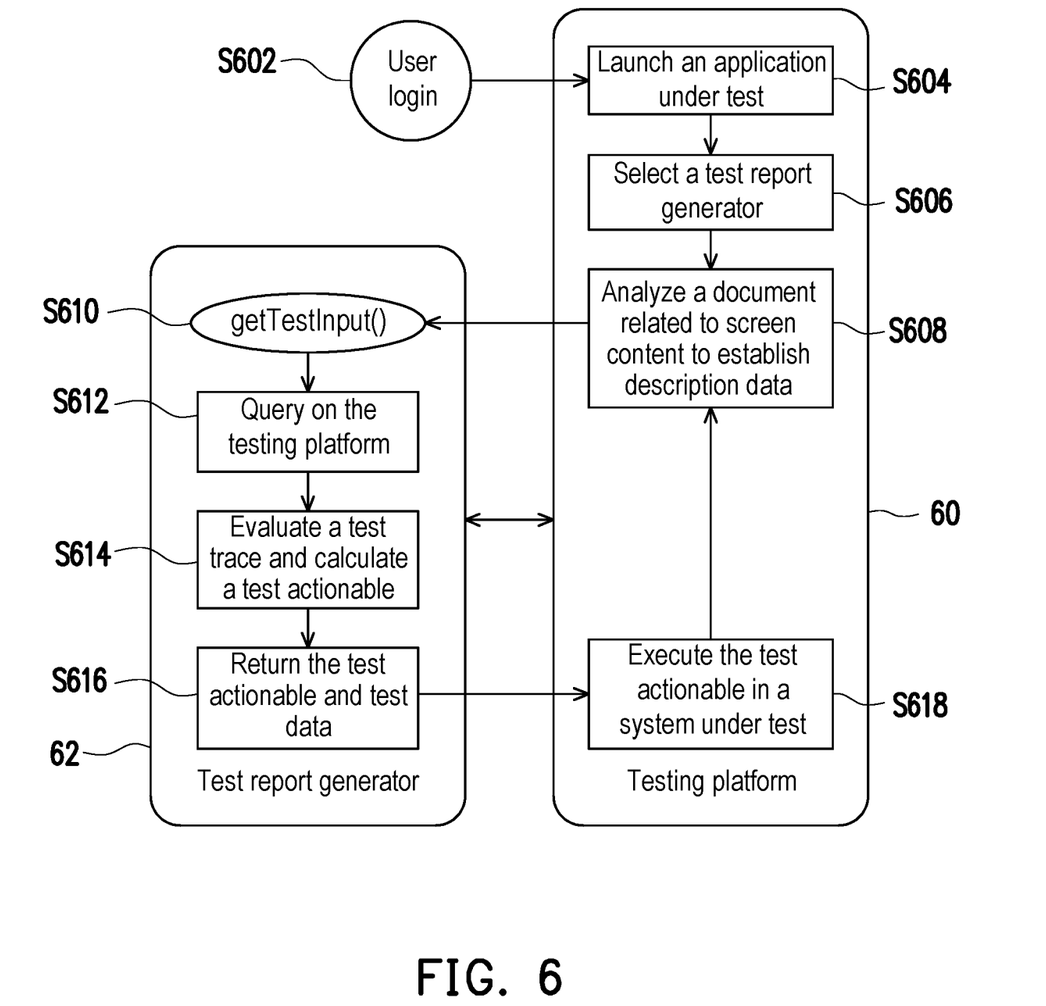
FIG. 6 is an example of a method for generating software test reports illustrated according to an embodiment of the disclosure.

More specifically, FIG. 6 is an example of a method for generating software test reports illustrated according to an embodiment of the disclosure. Referring to FIG. 6, the embodiment describes interaction between a testing platform 60 and a test report generator 62.

In step S602, the user logs in the testing platform 60. The user may, for example, connect to a server providing the testing platform 60 through the Internet, and enter authentication information such as account name and password to log in the testing platform 60.

In step S604, the user launches an application under test (AuT) desired to be tested on the testing platform 60. In step S606, the user selects a test report generator desired to be executed on the testing platform 60. Taking FIG. 1 as an example, the user, for example, selects to open a project on the user interface 10 of the testing platform and launches the application under test AuT1. At this time, the user interface 10 displays the execution screen 122 of AuT1 on the screen 12. In addition, the user may select a test report generator desired to be executed in the test report generator field 142 of the user interface 10, so as to trigger the testing platform to automatically execute software testing and generate a test report.

In step S606, a document related to the screen content of the AuT is analyzed by the testing platform 60 so as to establish the description data (for example, a user-interface analytic description (UIAD)) of the screen content. The testing platform 60 may, for example, analyze a screenshot using the above-mentioned three-stage identification approach and obtain the description data. The description data is described in, for example but not limited to, a DOM language applicable to different SuTs.

In step S610, the testing platform executes the function "getTestInput( )" of the test report generator 62 selected by the user.

In step S612, an application programming interface (API) is executed by the test report generator 62 to query data such as the description data, test scripts ever executed on the SuT and test actionables from the testing platform 60. In step S614, a test trace of the AuT is evaluated using the data queried and a test actionable adapted for the AuT is calculated.

In step S616, the calculated test actionable (for example, an index) and the test data corresponding to each test actionable are returned by the test report generator 62 to the testing platform 60. In step S618, the test actionable is executed on the AuT in the SuT by the testing platform 60, so as to generate a test report of the AuT.

In some embodiments, during execution of the test actionable by the testing platform 60, if a change is found in the screen of the AuT, the process returns to step S608, where the screen content is retrieved and analyzed again and description data is established. Then, a test actionable suitable for the screen content is evaluated and calculated again by the test report generator 62, so as to execute the test actionable again. By repeating the above steps of analyzing the screen content, calculating the test actionable, and executing the test actionable, a test report that completely reflects operation of the AuT can be generated in the end.

In the embodiment, the test actionable returned by the test report generator 62 supports a cross-platform and cross-application testing capability. Therefore, the test report generator 62 developed on the testing platform 60 in the embodiment has reusability across different applications, different SuTs and operating systems.

Through the process described above, the testing platform 60 in the embodiment provides a highly efficient and cost-effective platform for developing and sharing test report generators, allowing a developer and a user of a test report generator to share, test, and use the test report generator, thus encouraging exchange of software testing technology.

Based on a framework of the testing platform, the embodiments of the disclosure may provide additional functions such as intelligent form filling, collaborative work on the test report generator, and data confidentiality, thereby providing convenience and safety to the developer and the user of the testing platform. Details thereof are described below by way of examples.

Intelligent Form Filling

To facilitate a regular form filing operation during execution of the test report generator, the embodiments of the disclosure provide an automatic form filling service which can be called by the test report generator. The service includes the following:

An appropriate test data card is selected based on the description data of the current screen content. An algorithm for the selection may be implemented by machine learning, natural language processing, or an algorithm matching an element topic of a DOM element with a data field in multiple test data cards. In some embodiments, the test data cards may be instantly established while a test report is generated. For example, if none of the existing test data cards completely matches the description data of the current screen content, fields that are matchable may be respectively found from among multiple test data cards and used to construct a test data card matching the description data of the current screen content, and the existing test data cards are not necessarily used.

Matching is performed between a data field in a selected test data card and other key test actionable elements in a DOM structure of target screen content. An algorithm for the matching may be implemented by machine learning, natural language processing, or an algorithm (for example, stable-marriage algorithm) matching a topic of a DOM element with a data field in multiple test data cards.

After the above two steps, the testing platform may automatically enter data field values of the matching data card into the DOM elements.

Collaborative Work

To maximize the test report generator available to the user of the testing platform, the embodiments of the disclosure may provide a service for promoting collaboration among test report generators. For example, in the embodiment, a large number of test report generators "x" may call another test report generator "y". In the service, for example, the test report generators "x" are allowed to execute the function "getTestInput( )" to return a list with the following three elements:

"callAlgorithm", "y", and callingParameters.

callingParameters may be a numerical value, a list, or a composite structure, and is selectable. When a return value is received from the test report generators "x", the testing platform may start to execute the test report generator "y"

until the test report generator "y" returns the following lists during execution of the function "getTestInput( )":
"exitAlgorithm", and "returnData".

"returnData" may be a numerical value, a list, or a composite structure, and is selectable. In the embodiment, a test report generator of the testing platform may call another test report generator similarly to how a method calling another method in a conventional programming language. To maintain calling and returning functions of the test report generator, in the embodiment, for example, a call stack of the test report generator is maintained.

Data Confidentiality

To protect data exchanged through the test report generator, the embodiments of the disclosure may provide the following protection and security mechanisms.

To protect intellectual property rights over the test report generator and avoid disclosing the know-how on the testing platform to users of other test report generators or users of the testing platform, in the embodiments of the disclosure, only the developer of the test report generator is allowed to submit an object file of the test report generator to the testing platform. The object file is, for example, a machine code of a physical CPU or a virtual machine such as a Java virtual machine (JVM) or a Python interpreter. Accordingly, the user of the test generator report is allowed to only download the object file of the test report generator from the testing platform.

To protect user privacy and device security of the test report generator, in the embodiments of the disclosure, a virus scanner may be used to scrutinize whether there is any security threat in the object file of the test report generator, and to reject or block downloading of the test report generator by the user when a potential threat is detected. In the embodiments of the disclosure, a scanning report may be generated and provided to the developer of the test report generator.

In the embodiments of the disclosure, a security test script may be used to detect whether there is any malicious or abnormal behavior in the test report generator. A security test on the test report generator may be conducted at a client end of the testing platform before the test report generator is submitted to the testing platform for download by all users. The security test may also be conducted at a server end of the testing platform after the server end receives the object file of the test report generator. In the embodiments of the disclosure, a security test report may be generated and provided to the developer of the test report generator.

To ensure quality of the test report generator to be downloaded by the user of the testing platform, in the embodiments of the disclosure, a quality assurance (QA) test script may be used to find a defect of the test report generator. A QA test on the test report generator may be conducted at the client end of the testing platform before the test report generator is submitted to the testing platform for download by all users. The QA test on the test report generator may also be conducted at the server end of the testing platform after the server end receives the object file of the test report generator. In the embodiments of the disclosure, a QA test report may be generated and provided to the developer of the test report generator.

To prevent the test report generator from being pirated by a user with no permission to use it, in the embodiments of the disclosure, a mechanism is provided to prohibit the user from directly or indirectly copying an object file of the test report generator from one device to another and executing the test report generator on the another device. The mechanism, for example, uses an authentication algorithm or a secret token to reject or block a user or a device that fails to pass authentication or properly deal with the secret token. More specifically, the testing platform may, for example, generate a token based on user information of the test report generator and use the token to encrypt the data of the test report generator. In actual execution of the test report generator, the user information about the current user of the test report generator is obtained to generate a token and decrypt the encrypted data of the test report generator, so as to execute the test report generator after decryption of a return value thereof.

In summary, in the method and the apparatus for generating software test reports in the embodiments of the disclosure, screen content of an application under test is analyzed and described in a DOM language, thereby enabling a test report generator using the description data to support cross-platform and cross-application testing. The test report generator evaluates and calculates a test actionable adapted for the application under test by querying data from the testing platform. Finally, the testing platform executes the test actionable and assists the test report generator in generating a test report. Accordingly, the embodiments of the disclosure provide a testing platform that facilitates sharing, testing and use of a test report generator, thereby promoting exchange of software testing technology.

It will be apparent to those skilled in the art that various modifications and variations can be made to the structure of the disclosure without departing from the scope or spirit of the disclosure. In view of the foregoing, it is intended that the disclosure cover modifications and variations of the disclosure provided they fall within the scope of the following claims and their equivalents.

What is claimed is:

1. A method for generating software test reports, adapted for an electronic device with a processor, the method comprising:

providing a testing platform, retrieving one or more documents related to screen content of an application under test (AuT) by the testing platform, and analyzing the one or more documents to obtain description data of the screen content;

selecting to execute a test report generator, and querying the description data, a plurality of test scripts ever executed on a system under test (SuT) and a plurality of test actionables from the testing platform by the test report generator, so as to evaluate a test trace of the application under test, calculate at least one test actionable and test data adapted for the application under test, and return the calculated at least one test actionable and test data to the testing platform; and executing the at least one test actionable on the application under test in the system under test by the testing platform, so as to generate a test report of the application under test, generating a token by the testing platform based on user information of the test report generator to encrypt data of the test report generator, wherein selecting to execute the test report generator comprises:

obtaining the user information about a current user of the test report generator to generate the token and decrypt the encrypted data of the test report generator, so as to execute the test report generator after decryption of a return value thereof, wherein analyzing the one or more documents to obtain the description data of the screen content comprises:

parsing a plurality of labels in a marked document of the screen content to obtain a document object model (DOM) structure of the screen content;
predicting an image topic of each of a plurality of elements in the document object model structure by a machine learning model;
introducing the predicted image topic of the each of the plurality of elements and labeling information in the marked document corresponding to the each of the plurality of elements or a surrounding element into the machine learning model or a classification algorithm, so as to predict an element topic of the each of the plurality of elements; and
combining the element topics of the plurality of elements to predict an application topic of the screen content.

2. The method according to claim 1, wherein parsing the plurality of labels in the marked document of the screen content to obtain the document object model structure of the screen content comprises:
analyzing an attribute of each of the plurality of labels, and combining or removing the each of the plurality of elements based on a relationship between the attribute and the corresponding element.

3. The method according to claim 1, wherein querying the description data, the plurality of test scripts ever executed on the system under test and the plurality of test actionables from the testing platform by the test report generator further comprises:
querying one of, or a combination of, a plurality of environmental settings of the testing platform, type, an execution state and a plurality of attributes of the system under test, user information of the test report generator, and any other test report generator related to the test report generator.

4. The method according to claim 1, wherein executing the at least one test actionable on the application under test in the system under test by the testing platform further comprises:
receiving a call made by the test report generator to another test report generator, so as to add the another test report generator being called to an execution stack and execute the another test report generator; and
receiving an exit command on the another report generator, so as to remove the another test report generator from the execution stack and execute a next test report generator in the execution stack.

5. The method according to claim 1, wherein executing the at least one test actionable on the application under test in the system under test by the testing platform further comprises:
making an overall comparison between the screen content and a plurality of existing test data cards, calculating possibilities of matches between a plurality of data input elements in the screen content and a plurality of fields provided by the plurality of test data cards, and finding out the field that is most matching, so as to enter data field content needed for executing the at least one test actionable in the field in the plurality of test data cards.

6. An apparatus for generating software test reports, the apparatus comprising:
a display device;
an input device receiving an input operation of a user;
a storage device storing a computer program; and
a processor coupled to the display device, the input device, and the storage device, and configured to load and execute the computer program to:
provide a testing platform on the display device, retrieve one or more documents related to screen content of an application under test by the testing platform, and analyze the one or more documents to obtain description data of the screen content;
select to execute a test report generator based on the input operation, and query the description data, a plurality of test scripts ever executed on a system under test and a plurality of test actionables from the testing platform by the test report generator, so as to evaluate a test trace of the application under test, calculate at least one test actionable and test data adapted for the application under test, and return the at least one calculated test actionable and test data to the testing platform; and
execute the at least one test actionable on the application under test in the system under test by the testing platform, so as to generate a test report of the application under test,
wherein the processor further generates a token based on user information of the test report generator by the testing platform to encrypt data of the test report generator, wherein the processor is configured to obtain the user information about a current user of the test report generator to generate the token and decrypt the encrypted data of the test report generator, so as to execute the test report generator after decryption of a return value thereof,
wherein the processor is configured to:
parse a plurality of labels in a marked document of the screen content to obtain a document object model structure of the screen content;
predict an image topic of each of a plurality of elements in the document object model structure by a machine learning model;
introduce the predicted image topic of the each of the plurality of elements and labeling information in the marked document corresponding to the each of the plurality of elements and a surrounding element into the machine learning model or a classification algorithm, so as to predict an element topic of the each of the plurality of elements; and
combine the element topics of the plurality of elements to predict an application topic of the screen content.

7. The apparatus for generating software test reports according to claim 6, wherein the processor is configured to:
analyze an attribute of each of the plurality of labels, and combine or remove the each of the plurality of elements based on a relationship between the attribute and the corresponding element.

8. The apparatus for generating software test reports according to claim 6, wherein the processor further queries one of, or a combination of, a plurality of environmental settings of the testing platform, type, an execution state and a plurality of attributes of the system under test, user information of the test report generator, and any other test report generator related to the test report generator.

9. The apparatus for generating software test reports according to claim 6, wherein the processor is further configured to:
receive a call made by the test report generator to another test report generator, so as to add the another test report generator being called to an execution stack and execute the another test report generator; and
receive an exit command on the another report generator, so as to remove the another test report generator from the execution stack and execute a next test report generator in the execution stack.

10. The apparatus for generating software test reports according to claim 6, wherein the processor further makes an overall comparison between the screen content and a plurality of existing test data cards, calculates possibilities of matches between a plurality of data input elements in the screen content and a plurality of fields provided by the plurality of test data cards, and finds out the field that is most matching, so as to enter data field content needed for executing the at least one test actionable in the field in the plurality of test data cards.

11. The apparatus for generating software test reports according to claim 6, further comprising:
  a connection device connected to a mobile computing device, wherein in response to the application under test running on the mobile computing device, the processor executes the at least one test actionable on the application under test in the mobile computing device and generates a test report of the application under test.

\* \* \* \* \*